(12) United States Patent
Hamilton

(10) Patent No.: US 11,966,038 B2
(45) Date of Patent: Apr. 23, 2024

(54) VIEWING OPTIC WITH A BASE HAVING A LIGHT MODULE

(71) Applicant: Sheltered Wings, Inc., Barneveld, WI (US)

(72) Inventor: David M. Hamilton, Barneveld, WI (US)

(73) Assignee: SHELTERED WINGS, INC., Barneveld, WI (US)

( * ) Notice: Subject to any disclaimer, the term of this patent is extended or adjusted under 35 U.S.C. 154(b) by 464 days.

(21) Appl. No.: 16/359,497

(22) Filed: Mar. 20, 2019

(65) Prior Publication Data

US 2019/0293919 A1 Sep. 26, 2019

Related U.S. Application Data

(60) Provisional application No. 62/645,584, filed on Mar. 20, 2018.

(51) Int. Cl.
| | |
|---|---|
| *G02B 23/16* | (2006.01) |
| *G02B 7/04* | (2021.01) |
| *F41G 1/30* | (2006.01) |
| *F41G 1/38* | (2006.01) |
| *F41G 3/06* | (2006.01) |
| *F41G 3/08* | (2006.01) |
| *F41G 11/00* | (2006.01) |

(52) U.S. Cl.
CPC ............... *G02B 23/16* (2013.01); *G02B 7/04* (2013.01); *F41G 1/30* (2013.01); *F41G 1/38* (2013.01); *F41G 3/065* (2013.01); *F41G 3/08* (2013.01); *F41G 11/003* (2013.01)

(58) Field of Classification Search
CPC ...... G02B 23/16; G02B 23/04; G02B 23/105; G02B 23/14; G02B 27/10; G02B 27/283; G02B 27/0101; G02B 7/04; G02B 9/60; F41G 1/30; F41G 1/38; F41G 1/42; F41G 1/383; F41G 1/345; F41G 3/065; F41G 3/08; F41G 3/06; F41G 3/142; F41G 3/165; F41G 11/003; F41G 11/00; F41G 11/001; H01L 27/3225
USPC ......................... 359/427, 400, 424, 425, 428
See application file for complete search history.

(56) References Cited

U.S. PATENT DOCUMENTS

| 2,514,257 A | 7/1950 | Reavis |
| 3,058,391 A | 10/1962 | Marcus |

(Continued)

FOREIGN PATENT DOCUMENTS

| EP | 1340956 B1 | 12/2006 |
| EP | 1772695 B2 | 7/2010 |

(Continued)

OTHER PUBLICATIONS

ATN X-Sight 3-12x Digital Scopes for Rifles—Day & Night vision optics, https://www.atncorp.com/x-sight-night-vision-rifle-scope-3-12x, printed Jul. 12, 2016, 10 pages.

(Continued)

*Primary Examiner* — Stephone B Allen
*Assistant Examiner* — Jyotsna V Dabbi
(74) *Attorney, Agent, or Firm* — Husch Blackwell LLP

(57) ABSTRACT

The disclosure relates to a viewing optic having a main body and a base that couples to the main body. The base contains a light module for a reticle.

7 Claims, 18 Drawing Sheets

(56) References Cited

U.S. PATENT DOCUMENTS

| | | |
|---|---|---|
| 3,464,770 A | 9/1969 | Schmidt |
| 3,533,696 A | 10/1970 | Winter |
| 4,248,496 A | 2/1981 | Akin et al. |
| 4,395,096 A | 7/1983 | Gibson |
| 4,554,744 A | 11/1985 | Huckenbeck |
| 4,561,204 A | 12/1985 | Binion |
| 4,627,171 A | 12/1986 | Dudney |
| 4,695,161 A | 9/1987 | Reed |
| 4,965,439 A | 10/1990 | Moore |
| 5,026,158 A | 6/1991 | Golubic |
| 5,052,801 A | 10/1991 | Downes, Jr. et al. |
| 5,092,670 A | 3/1992 | Preston |
| 5,225,838 A | 7/1993 | Kanter et al. |
| 5,291,263 A | 3/1994 | Kong |
| 5,311,203 A | 5/1994 | Norton |
| 5,339,720 A | 8/1994 | Pellarin et al. |
| 5,355,224 A | 10/1994 | Wallace |
| 5,375,072 A | 12/1994 | Cohen |
| 5,491,546 A | 2/1996 | Wascher et al. |
| 5,528,354 A | 6/1996 | Uwira |
| 5,669,174 A | 9/1997 | Teetzel |
| 5,686,690 A | 11/1997 | Lugheed et al. |
| 5,721,641 A | 2/1998 | Aoki |
| 5,771,623 A | 6/1998 | Pernstich et al. |
| 5,903,996 A | 5/1999 | Morley |
| 5,920,995 A | 7/1999 | Sammut |
| 5,926,259 A | 7/1999 | Bamberger et al. |
| 6,032,374 A | 3/2000 | Sammut |
| 6,128,054 A | 10/2000 | Schwarzenberger |
| 6,132,048 A | 10/2000 | Gao et al. |
| 6,247,259 B1 | 6/2001 | Tsadka et al. |
| 6,252,706 B1 | 6/2001 | Kaladgew |
| 6,269,581 B1 | 8/2001 | Groh |
| 6,453,595 B1 | 9/2002 | Sammut |
| 6,516,551 B2 | 2/2003 | Gaber |
| 6,516,699 B2 | 2/2003 | Sammut et al. |
| 6,614,975 B2 | 9/2003 | Richardson et al. |
| 6,640,482 B2 | 11/2003 | Carlson |
| 6,681,512 B2 | 1/2004 | Sammut |
| 6,691,447 B1 | 2/2004 | Otteman |
| 6,721,095 B2 | 4/2004 | Huber |
| 6,862,832 B2 | 3/2005 | Barrett |
| 7,124,531 B1 | 10/2006 | Florence et al. |
| 7,196,329 B1 | 3/2007 | Wood et al. |
| 7,269,920 B2 | 9/2007 | Staley, III |
| 7,295,296 B1 | 11/2007 | Galli |
| 7,296,358 B1 | 11/2007 | Murphy et al. |
| 7,310,071 B2 | 12/2007 | Cuprys |
| 7,325,320 B2 | 2/2008 | Gnepf et al. |
| 7,333,270 B1 | 2/2008 | Pochapsky et al. |
| 7,516,571 B2 | 4/2009 | Scrogin et al. |
| 7,575,327 B2 | 8/2009 | Uchiyama |
| 7,586,586 B2 | 9/2009 | Constantikes |
| 7,654,029 B2 | 2/2010 | Peters et al. |
| 7,690,145 B2 | 4/2010 | Peters et al. |
| 7,703,679 B1 | 4/2010 | Bennetts et al. |
| 7,712,225 B2 | 5/2010 | Sammut |
| 7,719,769 B2 | 5/2010 | Sugihara et al. |
| 7,721,481 B2 | 5/2010 | Houde-Walter |
| 7,804,643 B2 | 9/2010 | Menges et al. |
| 7,805,020 B2 | 9/2010 | Trudeau et al. |
| 7,832,137 B2 | 11/2010 | Sammut et al. |
| 7,856,750 B2 | 12/2010 | Sammut et al. |
| 7,859,650 B2 | 12/2010 | Vermillion et al. |
| 7,864,432 B2 | 1/2011 | Ottney |
| 7,905,046 B2 | 3/2011 | Smith et al. |
| 7,937,878 B2 | 5/2011 | Sammut et al. |
| 7,946,048 B1 | 5/2011 | Sammut |
| 8,001,714 B2 | 8/2011 | Davidson |
| 8,046,951 B2 | 11/2011 | Peters et al. |
| 8,051,597 B1 | 11/2011 | D'Souza et al. |
| 8,081,298 B1 | 12/2011 | Cross |
| 8,109,029 B1 | 2/2012 | Sammut et al. |
| 8,201,741 B2 | 6/2012 | Bennetts et al. |
| 8,230,635 B2 | 7/2012 | Sarmut et al. |
| 8,353,454 B2 | 1/2013 | Sammut et al. |
| 8,365,455 B2 | 2/2013 | Davidson et al. |
| 8,448,372 B2 | 5/2013 | Peters et al. |
| 8,468,930 B1 | 6/2013 | Bell |
| 8,656,630 B2 | 2/2014 | Sammut |
| 8,707,608 B2 | 4/2014 | Sammut et al. |
| 8,713,843 B2 | 5/2014 | Windauer |
| 8,826,583 B2 | 9/2014 | Kepler et al. |
| 8,833,655 B2 | 9/2014 | McCarty et al. |
| 8,857,714 B2 | 10/2014 | Benson |
| 8,893,971 B1 | 11/2014 | Sammut et al. |
| 8,905,307 B2 | 12/2014 | Sammut et al. |
| 8,959,824 B2 | 2/2015 | Sammut et al. |
| 8,966,806 B2 | 3/2015 | Sammut et al. |
| 8,991,702 B1 | 3/2015 | Sammut et al. |
| 9,038,901 B2 | 5/2015 | Paterson et al. |
| 9,068,794 B1 | 6/2015 | Sammut |
| 9,121,671 B2 | 9/2015 | Everett |
| 9,151,574 B2 | 10/2015 | Lowrey, III |
| 9,175,927 B2 | 11/2015 | Tubb |
| 9,250,038 B2 | 2/2016 | Sammut et al. |
| 9,255,771 B2 | 2/2016 | Sarmut et al. |
| 9,279,975 B2 | 3/2016 | Berlips |
| 9,310,163 B2 | 4/2016 | Bay |
| 9,323,061 B2 | 4/2016 | Edwards et al. |
| 9,335,123 B2 | 5/2016 | Sammut |
| 9,389,425 B2 | 7/2016 | Edwards et al. |
| 9,429,745 B2 | 8/2016 | Brumfield |
| 9,459,077 B2 | 10/2016 | Sammut et al. |
| 9,500,444 B2 | 11/2016 | Sammut et al. |
| 9,574,850 B2 | 2/2017 | Sammut et al. |
| 9,612,086 B2 | 4/2017 | Sammut et al. |
| 9,631,896 B2 | 4/2017 | Scroggins |
| 9,869,530 B2 | 1/2018 | Sammut et al. |
| 10,060,703 B2 | 8/2018 | Sammut et al. |
| 10,175,031 B2 | 1/2019 | VanBecelaere |
| 10,180,565 B2 | 1/2019 | Havens et al. |
| 10,254,082 B2 | 4/2019 | Sammut et al. |
| 10,295,307 B2 | 5/2019 | Sammut et al. |
| 2002/0159148 A1 | 10/2002 | Huber |
| 2003/0010190 A1 | 1/2003 | Sammut et al. |
| 2003/0012035 A1 | 1/2003 | Bernard |
| 2003/0086165 A1* | 5/2003 | Cross ............... F41G 1/38 359/424 |
| 2003/0132860 A1 | 7/2003 | Feyereisen et al. |
| 2004/0025396 A1 | 2/2004 | Schlierbach |
| 2004/0080938 A1 | 4/2004 | Holman et al. |
| 2004/0201886 A1 | 10/2004 | Skinner et al. |
| 2005/0021282 A1 | 1/2005 | Sammut et al. |
| 2005/0046706 A1 | 3/2005 | Sesek et al. |
| 2005/0198885 A1 | 9/2005 | Staley, III |
| 2005/0250085 A1 | 11/2005 | Lemp, III et al. |
| 2005/0268521 A1 | 12/2005 | Cox et al. |
| 2006/0048432 A1 | 3/2006 | Staley et al. |
| 2006/0201047 A1 | 9/2006 | Lowrey |
| 2006/0254115 A1 | 11/2006 | Thomas et al. |
| 2007/0044364 A1 | 3/2007 | Sammut et al. |
| 2007/0097351 A1 | 3/2007 | York et al. |
| 2007/0137008 A1 | 6/2007 | Anstee |
| 2007/0137088 A1 | 6/2007 | Peters et al. |
| 2007/0157502 A1 | 7/2007 | Holmberg |
| 2007/0180751 A1 | 8/2007 | Joannes |
| 2007/0234626 A1 | 10/2007 | Murdock et al. |
| 2007/0277421 A1 | 12/2007 | Perkins et al. |
| 2008/0039962 A1 | 2/2008 | Mcrae |
| 2008/0163536 A1 | 7/2008 | Koch et al. |
| 2008/0290164 A1 | 11/2008 | Papale et al. |
| 2009/0200376 A1 | 8/2009 | Peters et al. |
| 2009/0205239 A1 | 8/2009 | Smith, III |
| 2009/0225236 A1 | 9/2009 | Yoon |
| 2009/0320348 A1 | 12/2009 | Kelly |
| 2010/0207152 A1 | 8/2010 | Won |
| 2010/0225833 A1 | 9/2010 | Methe et al. |
| 2010/0275768 A1 | 11/2010 | Quinn |
| 2011/0121159 A1 | 5/2011 | Mourar et al. |
| 2011/0141381 A1 | 6/2011 | Minikey et al. |
| 2011/0162250 A1 | 7/2011 | Windauer et al. |
| 2011/0314720 A1 | 12/2011 | Cheng |
| 2012/0000108 A1 | 1/2012 | Zusman |

(56) References Cited

U.S. PATENT DOCUMENTS

| | | |
|---|---|---|
| 2012/0075168 A1 | 3/2012 | Osterhout et al. |
| 2012/0097741 A1 | 4/2012 | Karcher |
| 2012/0126001 A1 | 5/2012 | Justice et al. |
| 2012/0186131 A1 | 7/2012 | Windauer |
| 2013/0033746 A1 | 2/2013 | Brumfield |
| 2013/0167425 A1 | 7/2013 | Crispin |
| 2013/0199074 A1 | 8/2013 | Paterson et al. |
| 2013/0279013 A1 | 10/2013 | Edwards et al. |
| 2014/0059915 A1 | 3/2014 | Sammut et al. |
| 2014/0063261 A1 | 3/2014 | Betensky et al. |
| 2014/0075820 A1 | 3/2014 | Ben-Ami |
| 2014/0101982 A1 | 4/2014 | McPhee |
| 2014/0110482 A1 | 4/2014 | Bay |
| 2014/0182187 A1 | 7/2014 | McHale |
| 2014/0226214 A1 | 8/2014 | Edwards et al. |
| 2015/0055119 A1 | 2/2015 | Hamilton |
| 2015/0106046 A1 | 4/2015 | Chen et al. |
| 2015/0233674 A1 | 8/2015 | Beckman |
| 2015/0247702 A1 | 9/2015 | Davidson et al. |
| 2015/0276346 A1* | 10/2015 | Hamilton ............... F41G 1/473 42/122 |
| 2015/0362288 A1 | 12/2015 | Sammut et al. |
| 2015/0369565 A1 | 12/2015 | Kepler |
| 2016/0028970 A1* | 1/2016 | Masarik ............ G02B 26/0816 348/341 |
| 2016/0061566 A1 | 3/2016 | Chen |
| 2016/0061567 A1 | 3/2016 | Regan et al. |
| 2016/0138890 A1 | 5/2016 | Hofmann et al. |
| 2016/0169625 A1 | 6/2016 | Richards et al. |
| 2016/0223293 A1 | 8/2016 | Maryfield et al. |
| 2016/0223805 A1 | 8/2016 | Waterman et al. |
| 2016/0226214 A1 | 8/2016 | Ishii et al. |
| 2016/0265880 A1 | 9/2016 | Maryfield et al. |
| 2017/0138698 A1 | 5/2017 | York et al. |
| 2017/0227327 A1 | 8/2017 | Thomas et al. |
| 2018/0010887 A1 | 1/2018 | VanBecelaere |
| 2018/0128576 A1* | 5/2018 | Zang ...................... F41G 1/38 |
| 2018/0224241 A1 | 8/2018 | Havens et al. |
| 2018/0224242 A1* | 8/2018 | Bellah ..................... F41G 1/38 |
| 2018/0224244 A1 | 8/2018 | Havens et al. |
| 2018/0224650 A1 | 8/2018 | Havens et al. |
| 2018/0224651 A1 | 8/2018 | Havens et al. |

FOREIGN PATENT DOCUMENTS

| | | |
|---|---|---|
| WO | 2006/060007 A1 | 6/2006 |
| WO | 2014/167276 A1 | 10/2014 |
| WO | 2015/103155 A1 | 7/2015 |
| WO | 2018145097 A1 | 8/2018 |

OTHER PUBLICATIONS

Barska 2013 Master Catalog, 2013, 124 pages.

T. Edwards et al., High-brightness display in integrated weapon sight systems abstract, http://proceedings.spiedigitallibrary.org/proceeding.aspx?articleid=1882790, printed Jul. 12, 2016, 2 pages.

3-9x First Focal Plane Adjustable Objective Rifle Scope—Monstrum Tactical; http://monstrumtractical.com/products/3-9x-first-focal-plan-rifle-scope-adjustable-objective-range-finder-reticle?variant=15621625091, printed Jul. 12, 2016, 7 pages.

Nightforce Optics, Inc., Reticle MIL-R product sheets, 2013, 2 pages.

International Search Report dated Apr. 26, 2018 for International Patent Appln. No. PCT/US2018/017079, filed on Feb. 6, 2018, 3 pages.

Written Opinion of the International Search Authority dated Apr. 26, 2018 for International Patent Appln. No. PCT/US2018/017079, filed on Feb. 6, 2018, 26 pages.

International Search Report dated Aug. 16, 2019 for International Patent Appln. No. PCT/US19/28540, filed on Apr. 22, 2019, 2 pages.

Written Opinion of the International Search Authority dated Aug. 16, 2019 for International Patent Appln. No. PCT/US19/28540, filed on Apr. 22, 2019, 5 pages.

International Search Report and Written Opinion issued for International Application No. PCT/US19/23182 dated Jun. 7, 2019, 14 pages.

* cited by examiner

VIEWING OPTIC WITH A BASE HAVING A LIGHT MODULE

CROSS-REFERENCE TO RELATED APPLICATIONS

This application claims priority to and is a non-provisional application of U.S. Provisional Application No. 62/645,584 filed Mar. 20, 2018, which is incorporated herein by reference in its entirety.

FIELD

The disclosure relates to a viewing optic with a main body and a base coupled to the main body. In yet another embodiment, the base has a light module for a reticle.

BACKGROUND

Riflescopes have been used for well over a century and while the quality and features of these devices have improved tremendously over the years, the core components (and the limitations of those components) used in their design, manufacture and use are still very much the same today as they were 100 years ago. Riflescopes create a magnified or unmagnified image of a scene that is distant from the shooter on a focal plane, which is coincident with an aiming feature, or reticle. The reticle consists of wire or a material deposited in a pattern onto a glass surface and it is used as an aiming reference, which corresponds to the trajectory of the rifle to which it's attached. The reticle may also have specific features included to aid the shooter in making distance judgements and in compensating for bullet deviation at different distances.

One challenge in the industry is the design of a riflescope that can be used for close quarters shooting to medium distance shooting. Scopes of this nature are in demand with 1× magnification at the lowest setting and 6×, 8×, or even 10× at the highest magnification.

Particularly difficult to achieve is a riflescope that is First Focal Plane ("FFP") light bright reticle, with no dimming of the reticle when your head moves off axis. Certain riflescopes on the market have a 1-6× magnification, FFP, and daylight bright reticle but the reticle dims when the users head moves off axis.

More recently, new riflescopes have been introduced into the market that are 1-8× magnification, FFP, and daylight bright reticle with little-to-no dimming of the reticle when the user moves their head off axis. However, the problem with these riflescopes is that they have greatly reduced their Field of View to achieve this.

IMT makes a reticle called the "powerlight," which solves the problem of a daylight bright FFP reticle because of a diffraction grating process on the reticle that reflects light in a pattern that causes constructive interference and therefore directs and enhances the brightness of the light off the reticle pattern. This diffraction grating process is created using photo-lithography techniques often found in the microprocessor manufacturing industry. To complete the system, IMT directs light at the diffraction pattern on the reticle using a light module system or a special optics package mounted to the side of the reticle. The light module system and optics system will be used interchangeably throughout this disclosure. This optics package is rather large and takes up room inside the scope tube, which is at a premium.

In a riflescope that is a FFP reticle design, the space inside the scope tube at the FFP is what determines your potential for FOV and total elevation and windage travel. This space inside the scope tube can be used for both travel and FOV and you can give or take space for either element.

As an example, a typical 1-8×24 FFP riflescope might have an objective focal length of 50 mm. To determine how much lateral space (in mm) is required for 1 Milliradian (MRAD) of FOV or turret travel you take the objective focal length divided by 1000. In this case 50 mm/1000 (MRAD per mm)=0.050 mm. This means that 1 MRAD of angular turret travel or FOV takes up 0.050 mm of lateral space inside the scope tube. Often required for these types of riflescopes is about 29 MRAD of total travel for the end user to have enough space to zero their scope on their firearm.

The best modern optics that are 1-8× or 1-10× typically have a FOV at 1× equal to about 22° (about 384 MRAD). If we add up the lateral space needed for the total travel and FOV for the best optical designs on the market this total lateral space equals ((29+384)*0.050)=20.65 mm. When you now start to add up the mechanics required to house the reticle, not a lot of space remains for anything else.

Typical 1-8× or 1-10×FFP scopes use an industry standard 34 mm scope tube and for strength may have a wall thickness of 2 mm. This means the inside diameter may be around 30 mm. If you subtract the space for 29 MRAD of travel and 384MRAD of FOV (20.65 mm) you are left with 9.35 mm for mechanics just to hold the reticle. This space is easily used up just for the reticle holding mechanics. Now if you attempt to implement a light module system, such as the IMT "Powerlight" module, there is simply not enough room for everything. So, makers of the current riflescopes on the market simply trade space for FOV in order to fit the IMT "Powerlight" module.

Thus, a need still exists for a viewing optic that can have a day bright reticle with no compromise in other features, such as field of view. The apparatuses, systems, and methods disclosed herein address all of these shortcomings in an innovative fashion.

SUMMARY

In one embodiment, the disclosure relates to a viewing optic having a main body with an optical system having a first focal plane ("FFP") wherein a reticle is located at the FFP, and a base coupled to the main body, wherein the base has a light module for the reticle at the FFP. In one embodiment, the viewing optic can have one or more light modules.

In one embodiment, the disclosure relates to a viewing optic having a main body with an optical system having a first focal plane ("FFP") and a second focal plane ("SFP"), wherein a first reticle is located at the FFP and a second reticle is located at the SFP, and a base coupled to the main body, wherein the base has a light module for the reticle at the SFP.

In one embodiment, the disclosure relates to a viewing optic having a main body with an optical system having a first focal plane ("FFP") and a second focal plane ("SFP"), wherein a reticle is located at the FFP and a second reticle is located at the SFP, and a base coupled to the main body, wherein the base has a light module to illuminate the reticles at the FFP and the SFP. In another embodiment, the viewing optic can have a second light module for a reticle at the SFP.

In one embodiment, the disclosure relates to a viewing optic having a main body with an optical system having a FFP and a SFP, wherein a reticle is located at the FFP and/or the SFP, and a base coupled to the main body, wherein the base has a light module to illuminate the reticle located at the FFP and/or the SFP.

In one embodiment, the disclosure relates to a viewing optic having a main body with an optical system having a FFP and a SFP, wherein a first reticle is located at the FFP and a second reticle is located at the SFP, and a base coupled to the main body, wherein the base has a light module for the first reticle. In another embodiment, the base further has a second light module for the second reticle. In yet another embodiment, a single light module can provide light for the reticle at both the FFP and the SFP.

In one embodiment, the disclosure relates to a viewing optic having a main body with a first optical system comprised of an objective lens system that focuses an image from a target down to a first focal plane (hereafter referred to as the "FFP Target Image"), followed by an erector lens system that inverts the FFP Target Image and focuses it to a second focal plane (hereafter referred to as the "SFP Target Image"), an eyepiece lens system that collimates the SFP Target Image so that it can be observed by the human eye, with a reticle located at FFP and/or the SFP, and a base coupled to the main body, wherein the base has a light module to illuminate the reticle located at the FFP and/or the SFP.

In one embodiment the light module aids in the illumination of the reticle located at the FFP and/or the SFP but is not the only source for illumination.

In one embodiment, the disclosure relates to a viewing optic having a main tube, an objective system coupled to a first end of the main tube and an ocular system coupled to a second end of the main tube, wherein the main tube, the objective system and the ocular system are cooperatively configured to define at least one focal plane, and a base coupled to the main tube, wherein the base houses a light module for a reticle. In another embodiment, the main tube, the objective system and the ocular system are cooperatively configured to define a FFP having a reticle with light supplied by the module in the base. In another embodiment, the main tube, the objective system and the ocular system are cooperatively configured to define a FFP and a SFP, with reticles located at the FFP and the SFP and a light source supplied to the reticles by the module located in the base.

In one embodiment, the disclosure relates to a viewing optic with a main body having an optical system comprised of an objective lens system that focuses an image from a target down to a first focal plane (hereafter referred to as the "FFP Target Image"), followed by an erector lens system that inverts the FFP Target Image and focuses it to a second focal plane (hereafter referred to as the "SFP Target Image"), and an eyepiece lens system that collimates the SFP Target Image so that it can be observed by the human eye, and a base coupled to a bottom portion of the main body having a light module for a reticle. In one embodiment, the base is apportioned into one or more cavities or compartments.

In one embodiment, the disclosure relates to a viewing optic with a first optical system comprised of an objective lens system that focuses an image from a target down to a first focal plane (hereafter referred to as the "FFP Target Image"), followed by an erector lens system that inverts the FFP Target Image and focuses it to a second focal plane (hereafter referred to as the "SFP Target Image"), an eyepiece lens system that collimates the SFP Target Image so that it can be observed by the human eye, and a cavity with a light module.

In one embodiment, the disclosure relates to a viewing optic having a main body with an optical system having a first focal plane and a second focal plane, wherein a reticle is located at the FFP and/or the SFP, and a base coupled to the main body with a light module to direct light at a diffraction pattern on a reticle.

In one embodiment, the disclosure relates to a viewing optic having a body with direct viewing optics for viewing images of an outward scene and a base having a light module to direct light at the diffraction pattern on a reticle.

In one embodiment, the disclosure relates to a viewing optic having a main body with an optical system having an objective lens system, an erector system, and an eyepiece lens system and a moveable optical element having a first focal plane reticle and a second focal plane reticle, and a turret assembly that can adjust the moveable optic element, and a light module for the first focal plane reticle and/or the second focal plane reticle that is located in a portion of the turret assembly. In one embodiment, the light module is located in a cap or cover of the turret assembly.

In one embodiment, the base is separable from the main body. In one embodiment, the base couples to a bottom portion of the main body. In yet another embodiment, the base has a cavity that contains the optics system. In another embodiment, the cavity can also have a compartment for one or more power sources.

In another embodiment, the disclosure relates to a viewing optic having a main body with an optical system for viewing an outward scene and a base coupled to a bottom portion of the main body with a cavity having with a light module to direct light at a diffraction pattern on a reticle.

In one embodiment, the disclosure relates to housing coupled to a main body of a viewing optic, wherein the housing contains a light module to direct light at the diffraction pattern on a reticle.

In one embodiment, light module or optics system can be located at any position on an outer perimeter of a reticle. In one embodiment, the light module or optics system is placed at the 6 o'clock position of the reticle so the light module can utilize the space in the separable base.

An advantage of the apparatuses and methods disclosed herein is that a multitude of advanced targeting functions can be utilized while preserving a direct view of the target scene.

An advantage of the apparatuses and methods disclosed herein is that the base or cavity creates space for the light module so that there is no compromise in the Field of View, total travel, tube wall thickness, etc.

An advantage of the apparatuses and methods disclosed herein is that a separable base coupled to the main body of a viewing optic contains an IMT "Powerlight" module.

Additional advantages of the apparatuses and methods disclosed herein are: (1) viewing optic mounting base included with purchase; (2) no need for customer to purchase a separate base; (3) no need for customer to mount viewing optic into base; (4) no need to worry about getting proper scope cant while mounting; (5) space for larger battery to be housed for better battery life with less snag hazards as compared to a large side-mounted battery compartment; (6) with an integrated base/mount you have more options for the main-tube diameter since no scope rings are needed for mounting and the user will not have to worry about finding an industry non-standard or non-existent ring size; and (7) aesthetically looks much better.

Features, components, steps or aspects of one embodiment described herein may be combined with features, components, steps or aspects of other embodiments without limitation.

DETAILED DESCRIPTION

Figure 1A:
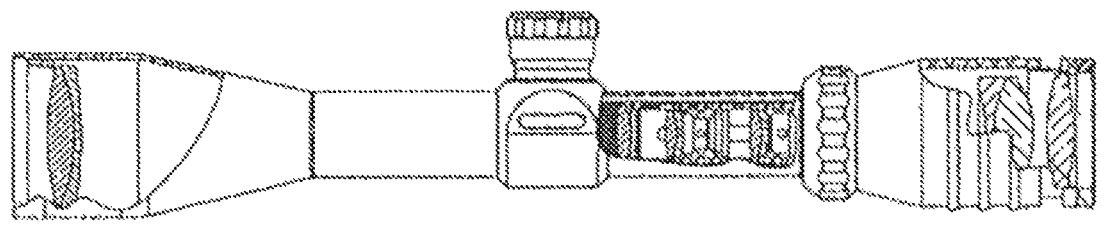
FIG. 1A is a schematic depicting parts of a riflescope.

The apparatuses and methods disclosed herein will now be described more fully hereinafter with reference to the accompanying drawings, in which embodiments of the disclosure are shown. The apparatuses and methods disclosed herein may, however, be embodied in many different forms and should not be construed as limited to the embodiments set forth herein. Rather, these embodiments are provided so that the disclosure will be thorough and complete and will fully convey the scope of the invention to those skilled in the art.

It will be appreciated by those skilled in the art that the set of features and/or capabilities may be readily adapted within the context of a standalone weapons sight, front-mount or rear-mount clip-on weapons sight, and other permutations of filed deployed optical weapons sights. Further, it will be appreciated by those skilled in the art that various combinations of features and capabilities may be incorporated into add-on modules for retrofitting existing fixed or variable weapons sights of any variety.

It will be understood that when an element or layer is referred to as being "on," "connected to" or "coupled to" another element or layer, it can be directly on, connected or coupled to the other element or layer. Alternatively, intervening elements or layers may be present. In contrast, when an element is referred to as being "directly on," "directly connected to" or "directly coupled to" another element or layer, there are no intervening elements or layers present.

Like numbers refer to like elements throughout. As used herein, the term "and/or" includes any and all combinations of one or more of the associated listed items.

It will be understood that, although the terms first, second, etc. may be used herein to describe various elements, components, regions, and/or sections, these elements, components, regions, and/or sections should not be limited by these terms. These terms are only used to distinguish one element, component, region, or section from another element, component, region, or section. Thus, a first element, component, region, or section discussed below could be termed a second element, component, region, or section without departing from the disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

I. Definitions

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, distances from a user of a device to a target.

The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, an "erector sleeve" is a protrusion from the erector lens mount which engages a slot in the erector tube and/or cam tube or which serves an analogous purpose. This could be integral to the mount or detachable.

As used herein, an "erector tube" is any structure or device having an opening to receive an erector lens mount.

As used herein, a "firearm" is a portable gun, being a barreled weapon that launches one or more projectiles often driven by the action of an explosive force. As used herein, the term "firearm" includes a handgun, a long gun, a rifle, shotgun, a carbine, automatic weapons, semi-automatic weapons, a machine gun, a sub-machine gun, an automatic rifle, and an assault rifle.

As used herein, the term "light module" refers to a module for directing light at a reticle. In one embodiment, the light is directed at the diffraction pattern on the reticle using an optics system.

As used herein, the term "viewing optic" refers to an apparatus used by a shooter or a spotter to select, identify or monitor a target. The "viewing optic" may rely on visual observation of the target, or, for example, on infrared (IR), ultraviolet (UV), radar, thermal, microwave, or magnetic imaging, radiation including X-ray, gamma ray, isotope and particle radiation, night vision, vibrational receptors including ultra-sound, sound pulse, sonar, seismic vibrations, magnetic resonance, gravitational receptors, broadcast frequencies including radio wave, television and cellular receptors, or other image of the target. The image of the target presented to the shooter by the "viewing optic" device may be unaltered, or it may be enhanced, for example, by magnification, amplification, subtraction, superimposition, filtration, stabilization, template matching, or other means. The target selected, identified or monitored by the "viewing optic" may be within the line of sight of the shooter, or tangential to the sight of the shooter, or the shooter's line of sight may be obstructed while the target acquisition device presents a focused image of the target to the shooter. The image of the target acquired by the "viewing optic" may be, for example, analog or digital, and shared, stored, archived, or transmitted within a network of one or more shooters and spotters by, for example, video, physical cable or wire, IR, radio wave, cellular connections, laser pulse, optical, 802.11b or other wireless transmission using, for example, protocols such as html, SML, SOAP, X.25, SNA, etc., Bluetooth™, Serial, USB or other suitable image distribution method. The term "viewing optic" is used interchangeably with "optic sight."

As used herein, the term "outward scene" refers to a real world scene, including but not limited to a target.

As used herein, the term "shooter" applies to either the operator making the shot or an individual observing the shot in collaboration with the operator making the shot.

II. Viewing Optic

Figure 1B:
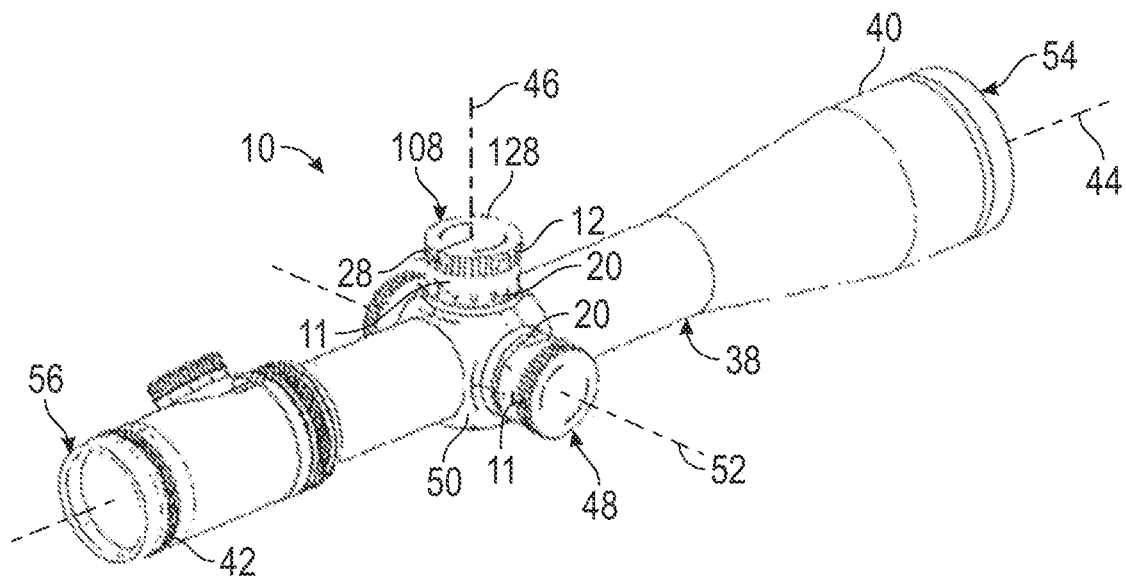
FIG. 1B is a schematic depicting additional parts and components of a viewing optic in accordance with one embodiment of the disclosure.

FIG. 1A illustrates the traditional design of a riflescope, which is a representative example of a viewing optic. FIG. 1B illustrates an exemplary viewing optic 10 in accordance with embodiments of the disclosure. Specifically, FIG. 1B illustrates a riflescope. More particularly, the riflescope 10 has a body 38 that encloses a movable optical element 15. The body 38 is an elongate tube tapering from a larger opening at its front 40 to a smaller opening at its rear 42. An eyepiece 56 is attached to the rear of the scope body, and an objective lens 54 is attached to the front of the scope body. The center axis of the movable optical element defines the optical axis 44 of the rifle scope.

An elevation turret 12 and a windage turret 48 are two dials that are often found in the outside center part of the body 38. They are marked in increments by indicia 20 on their perimeters 11 and are used to adjust the elevation and windage of the movable optical element for points of impact change. These dials protrude from the turret housing 50. The turrets are arranged so that the elevation turret rotation axis 46 is perpendicular to the windage turret rotation axis 52.

Figure 1C:
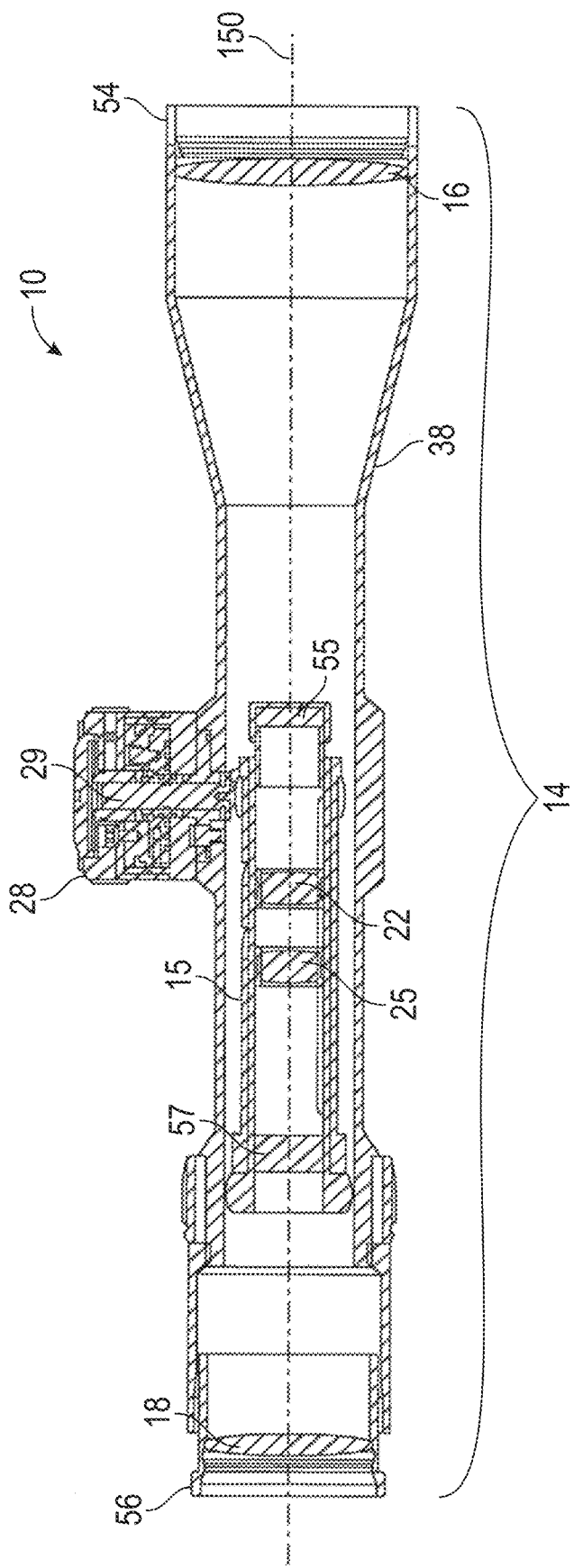
FIG. 1C is a cross section view of the viewing optic of FIG. 1B showing a moveable optic element inside the optic body according to one embodiment of the disclosure.

FIG. 1C shows a cross-section view of the sighting device from FIG. 1B with the basic components of optical system 14 and moveable optical element 15. As shown in FIG. 1C, optical system 14 includes an objective lens system 16, erector system 25, and eyepiece lens system 18. FIG. 1C shows a riflescope having a body 38, but optical system 14 could be used in other types of sighting devices as well. Erector system 25 may be included within a moveable optic element 15. In FIG. 1C, moveable optic element 15 also includes a collector 22, as well as first focal plane reticle 55 and second focal plane reticle 57. When in use, adjustment of turret assembly 28 and turret screw 29 causes adjustment of moveable optic element 15.

The movable optical element 15 is adjusted by rotating the turret assembly 28 one or more clicks. As the turret is rotated, a turret screw 29 moves in and out of the scope, which pushes the erector tube. The erector tube is biased by a spring so when the turret screw is adjusted, it locates the erector tube against the bottom face of the turret screw. The erector tube provides a smaller view of the total image. As the erector tube is adjusted, the position of the reticle is modified against the image.

A reticle is a circular, planar or flat transparent panel or disk mounted within the scope body in perpendicular relationship to the optical axis or line-of-sight through the scope, and is positioned between the objective lens element 54 and the erector lens element, typically at a site considered to be a front focal plane of the optical system within the housing. In one embodiment, the reticle contains fine etched lines or hairline indicia comprising a center vertical hairline and a center horizontal hairline, which orthogonally or perpendicularly intersect at a center point.

Figure 1D:
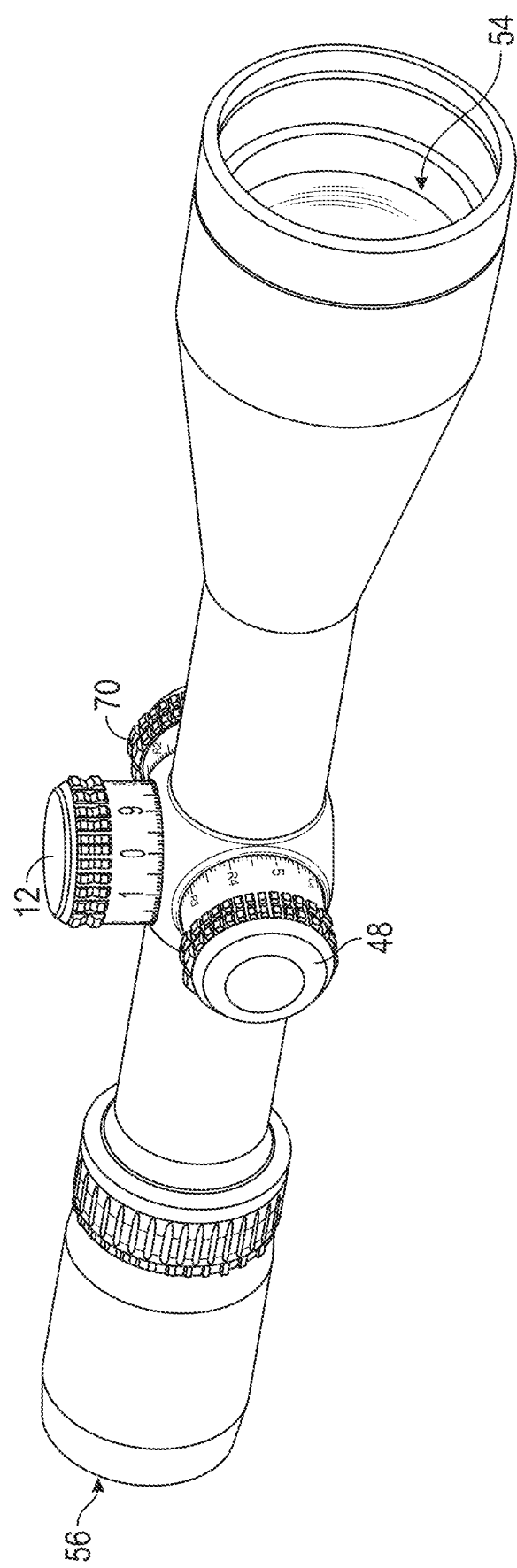
FIG. 1D is a schematic of a viewing optic depicting a parallax adjustment knob according to one embodiment of the disclosure.

In one embodiment, as shown in FIG. 1D, the viewing optic can have a parallax adjustment knob 70 or a focus knob. Parallax occurs when the optical plane of the image of a target is not coplanar with the optical plane of the image of the reticle. As a result of the offset between the two optical planes, the reticle can appear to move relative to the target when the marksman moves their eye around the center of the reticle. This parallax error can result in a shift in the point of impact from firing. The parallax adjustment of a viewing optic enables the marksman to eliminate optical error at different distances, by enabling the optical system to be adjusted to show the image of the target and the image of the reticle in the same optical plane. Parallax compensation changes neither the focus of the reticle nor the focus of the image; it simply moves the planes at which these two objects are in focus so that they share the same plane (are coincident).

As shown in FIG. 1D, the viewing optic can have a side wheel mounted to the rotatable parallax adjustment knob 70. The larger diameter of the side wheel provides more space for markers, such as range marker, to be applied, and is easier for the marksman to rotate and read when in use. The larger diameter of the side wheel serves to increase the accuracy and resolution of the range finding markers.

Figure 1E:
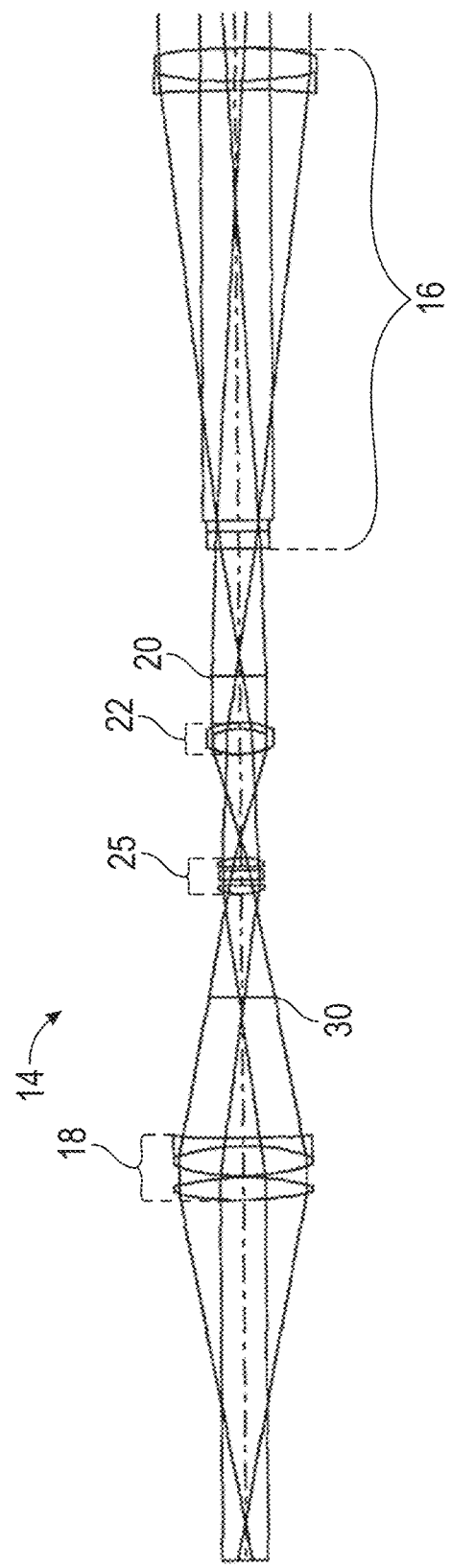
FIG. 1E is a schematic of the erector system in the optical element of the viewing optic according to one embodiment of the disclosure.

FIG. 1E shows a close-up view of an optical system 14 in cross-section, illustrating how light rays travel through the optical system 14. Optical system 14 may have additional optical components such as collector 22, and it is well known within the art that certain components, such as objective lens system 16, erector system 25, and eyepiece lens system 18 may themselves have multiple components or lenses.

In one embodiment, the viewing optic can have a focusing cell having one or more adjustable lens for providing parallax adjustment. In one embodiment, the one or more adjustable lens is one or parallax lenses.

In one embodiment, a focus lens is located between an ocular lens and an objective lens. The relative distance between the focus lens and the objective lens is adjustable, for providing parallax adjustment. In addition, erector lenses are located between the ocular lens and the focus lens. The relative distance between the erector lenses and the objective lens is adjustable, for providing magnification adjustment.

III. Viewing Optic with a Base Having a Light Module

In one embodiment, the disclosure relates to a viewing optic, including but not limited to a riflescope, having a first housing coupled to a second housing. In one embodiment, the first housing is a main body having an optical system. In yet another embodiment, the second housing is a base with a light module. In one embodiment, the light module is for a reticle.

In one embodiment, the disclosure relates to a viewing optic having a main body and a base coupled to the main body. In one embodiment, the base is separable from the main body. In one embodiment, the base is attached to a bottom portion of the main body. In one embodiment, a gasket is used to enclose the main body and the base.

In one embodiment, the disclosure relates to a viewing optic having a main body with a first optical system for generating images of an outward scene and a base coupled to the main body with a light module to direct light at a diffraction pattern on a reticle.

In one embodiment, the disclosure relates to a viewing optic having a main body with a first optical system comprised of an objective lens system that focuses an image from a target down to a first focal plane (hereafter referred to as the "FFP Target Image"), followed by an erector lens system that inverts the FFP Target Image and focuses it to a second focal plane (hereafter referred to as the "SFP Target Image"), an eyepiece lens system that collimates the SFP Target Image so that it can be observed by the human eye, with a reticle located at FFP, and a base coupled to the main body, wherein the base has a light module to help illuminate the reticle located at the FFP.

A. Main Body

In one embodiment, the main body is the shape of an elongate tube, which tapers from a larger opening at its front to a smaller opening at its rear and an eyepiece attached to the rear of the elongate tube, and an objective lens attached to the front of the elongate tube. In one embodiment, the first housing is a main body of a riflescope.

In one embodiment, the main body has a viewing input end, and a viewing output end, which can be aligned along viewing optical axis 54 (FIG. 1B), and can be inline. Objects or targets can be directly viewed by the eye of the user through the viewing input end, along the viewing direct view optics, and out the viewing output end. The main body can include an objective lens or lens assembly at the viewing input end. A first focal plane reticle can be positioned and spaced along the viewing optical axis A from the objective lens assembly.

In one embodiment, a picture or image reversal lens assembly can be positioned and spaced rearwardly along the viewing optical axis A from the first focal plane reticle. An erector tube having an erecting image system is located within the main body between the objective lens and the ocular lens in order to flip the image. This gives the image the correct orientation for land viewing. The erecting image system is usually contained within an erector tube.

The reversal lens assembly or erecting image system can comprise one or more lenses spaced apart from each other. The erector image system may include one or more movable optical elements, such as a focus lens that is movable along its optical axis to adjust the focus of the image and a magnification lens movable along its optical axis to optically magnify the image at the rear focal plane so that the target appears closer than its actual distance. Typically, the erector assembly includes a mechanical, electro-mechanical, or electro-optical system to drive cooperative movement of both the focus lens and one or more power-varying lens elements of the magnification lens to provide a continuously variable magnification range throughout which the erector assembly produces a focused, erect image of the distant target at the rear focal plane.

Variable magnification can be achieved by providing a mechanism for adjusting the position of the erector lenses in relationship to each other within the erector tube. This is typically done through the use of a cam tube that fits closely around the erector tube. Each erector lens (or lens group) is mounted in an erector lens mount that slides within the erector tube. An erector sleeve attached to the erector lens mount slides in a straight slot in the body of the erector tube to maintain the orientation of the erector lens. The erector sleeve also engages an angled, or curving, slot in the cam tube. Turning the cam tube causes the erector lens mount to move lengthwise within the guide tube, varying the magnification. Each erector lens will have its own slot in the cam tube and the configuration of these slots determines the amount and rate of magnification change as the cam tube is turned.

An aperture in a second focal plane can be positioned and spaced rearwardly along the viewing optical axis A from the picture reversal assembly. An ocular lens assembly can be positioned and spaced rearwardly along the viewing optical axis A from the aperture in the second focal plane, at the eyepiece. The ocular lens assembly can include one or more lenses spaced apart from each other. In some embodiments, the viewing optical axis A and the direct viewing optics can be folded.

B. Base

In one embodiment, a second housing is coupled to a first housing and contains a light module or optics system for directing light to a reticle. In one embodiment, the second housing is a base coupled to a portion of the main body of a viewing optic. In one embodiment, the base is separable from the main body of a viewing optic. U.S. Pat. No. 10,180,565 and U.S. patent application Ser. Nos. 16/246,689, and 16/247,089 describe a representative base that can house a light module for a reticle.

Figure 2:
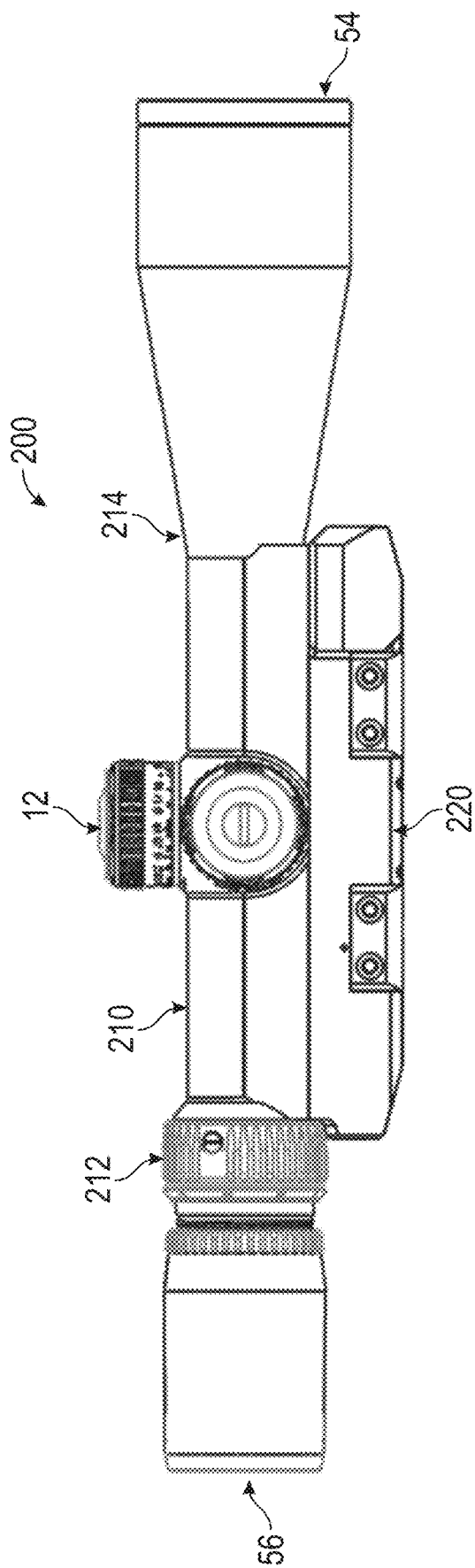
FIG. 2 is a view of a riflescope having a main body and a base, which couples to the main body according to one embodiment of the disclosure.

In a representative embodiment, FIG. 2 displays a side view of a riflescope 200 with a main body 210 and a base 220. In one embodiment, the base 220 is separable from the main body 210. The base 220 attaches at one end of the scope body near the magnification ring 212 and at the other end of the scope body near the objective assembly 214. In one embodiment, the main body 210 and the base 220 are made of the same material. In another embodiment, the scope body and the base are made of different materials.

In one embodiment, the base 220 is approximately the length of the erector tube of the main body.

Figure 3:
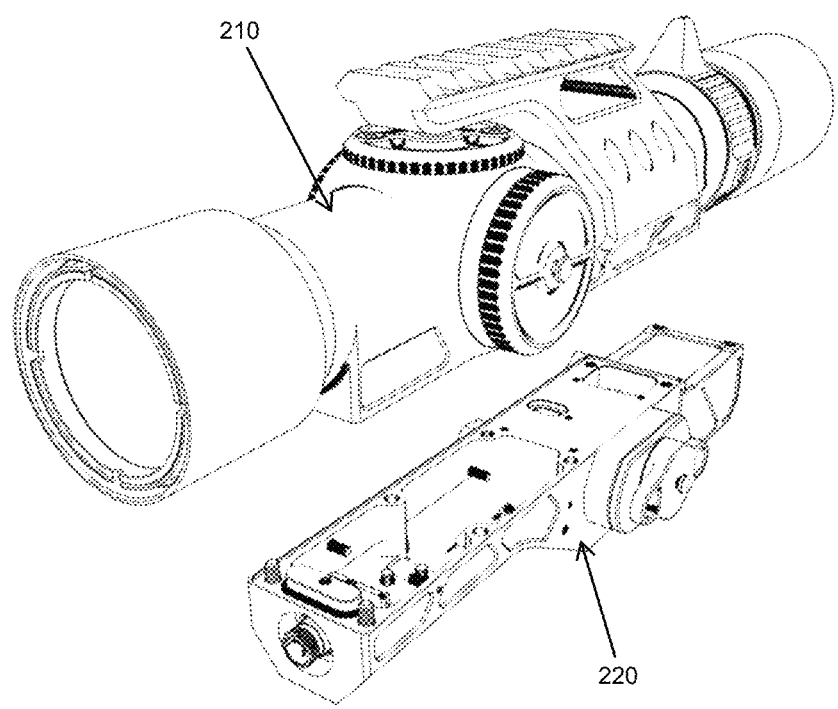
FIG. 3 is a representative view of a riflescope having a main body a base that couples to a bottom portion of the main body according to one embodiment of the disclosure.

FIG. 3 is a representative schematic of a riflescope showing the main body 210 separated from the base 220 for illustrative purposes. The base 220 couples to a bottom portion of the main body 210. The base 220 has space to accept a light module for a reticle, as well as space for additional components.

In one embodiment, the base is not an image stabilization device. In one embodiment, the length of the base is from 35% to 70% the length of the main body of a riflescope to which the base is coupled. In yet another embodiment, the base having a light module system is from 40% to 65% the length of the main body of a riflescope to which the base is coupled. In still another embodiment, the base having a light module for a reticle is no more than 65% of the length of the main body of the riflescope to which the base is coupled.

In one embodiment, the main body of the riflescope is about 2.5× the length of the base having a light module for a reticle. In yet another embodiment, the main body is from 1.5× to 2.5× the length of the base having a light module for a reticle. In yet another embodiment, the main body is at least 1.5× the length of the base having a light module for a reticle.

As shown in FIG. 2, the base 220 can be bolted to the scope body 210 of the riflescope to form a totally enclosed and integrated system. The base 220 can then be directly attached to the firearm without the need for traditional riflescope rings.

In one embodiment, a viewing optic having a main body and a base coupled to the main body with a light module for a reticle can be coupled to a firearm without the need for traditional riflescope rings. In one embodiment, a viewing optic has a main body and a base coupled to the main body with a light module for a reticle, wherein the bottom side of the base has a mounting rail.

In one embodiment, the base of the viewing optic can include a mounting rail for mounting to a desired firearm, equipment or device, and can have an adjustment mechanism including an elevation adjustment drum for adjusting the devotional position of the optics. A lateral adjustment mechanism is also typically provided for side-to-side adjustment. The adjustment mechanisms can be covered with a protection cap.

In one embodiment, the top side of the base couples to the bottom-side of the main body of a viewing optic and the bottom-side of the base has a mounting rail. In one embodiment, the top side of the base couples to a lateral split in the bottom-side of the main body of a viewing optic.

1. Light Module

In one embodiment, the viewing optic has a main body and a base that couples to the main body, wherein the base has a light module for a reticle. In one embodiment, the viewing optic has a main body and a base that couples to the main body, wherein the base has a light module that provides illumination to a reticle.

In one embodiment, the viewing optic has a main body and a base that couples to the main body, wherein the base has at least a portion of a light module for a reticle. In one embodiment, the viewing optic has a main body and a base that couples to the main body, wherein the base has at least a portion of a light module that provides illumination to a reticle.

In one embodiment, the complete light module system is located in the base. In another embodiment, a portion of the light module system is located in the base and a portion of the light module system is located in the main body.

In one embodiment, from about 50% to about 75% of the light module system is located in the base. In another embodiment, from about 75% to about 95% of the light module system is located in the base.

In still another embodiment, at least 40% of the light module system is located in the base.

In one embodiment, the viewing optic has a main body and a base that couples to the main body, wherein the base has a light module for directing light to a reticle. In one embodiment, the light is directed to a diffraction pattern on a reticle. In one embodiment, the light module is coupled, either directly or indirectly to a reticle. In yet another embodiment, the light module directs light to the reticle but is not connected to the reticle. In one embodiment, the reticle can be in the FFP or the SFP or both the FFP and the SFP.

In one embodiment, the light module couples to the outer perimeter of a reticle. In one embodiment, the reticle is a first focal plane reticle. In one embodiment, the reticle is located in the main body of the viewing optic.

Figure 4:
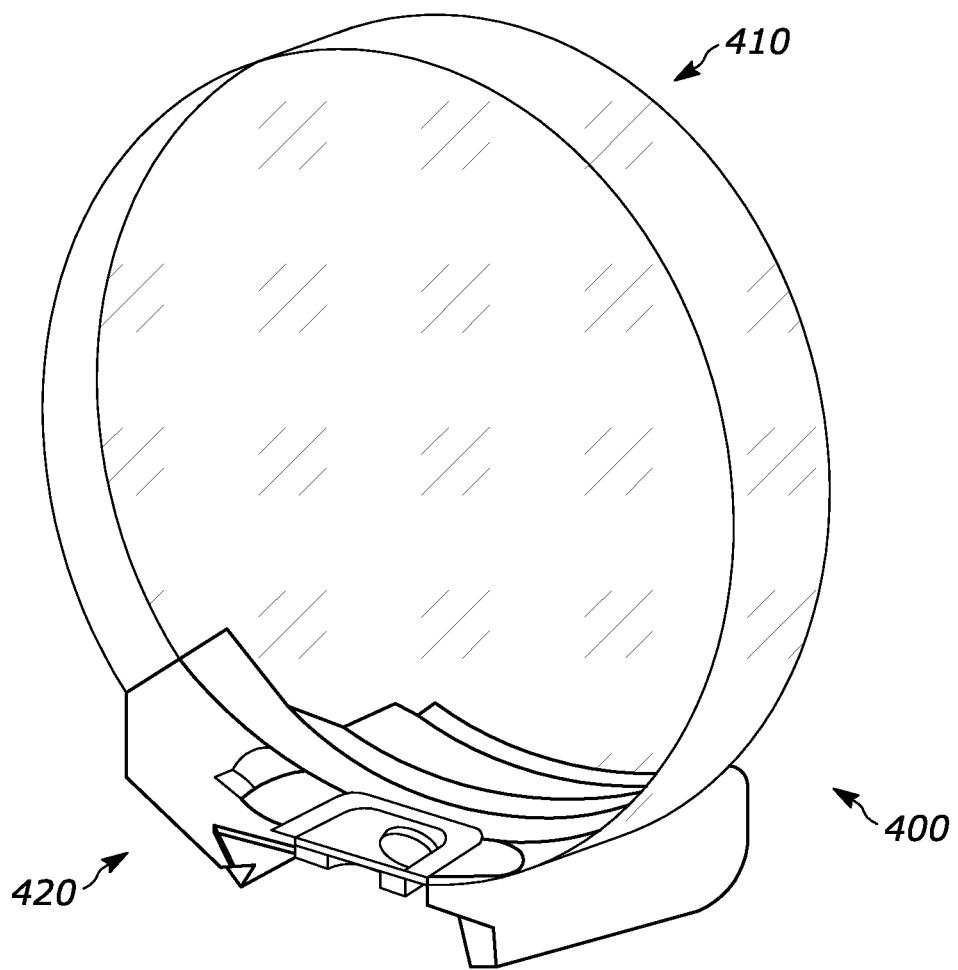
FIG. 4 is a representative depiction of a reticle system having a reticle and a light module, with the light module coupled at about the 6:00 position of the reticle according to one embodiment of the disclosure.

FIG. 4 is a schematic of a reticle system 400 with reticle 410 and a light module 420. The light module is shown at the 6:00 position of the reticle. The light module 420 fits in a base that couples to the main body of the viewing optic.

Figure 5:
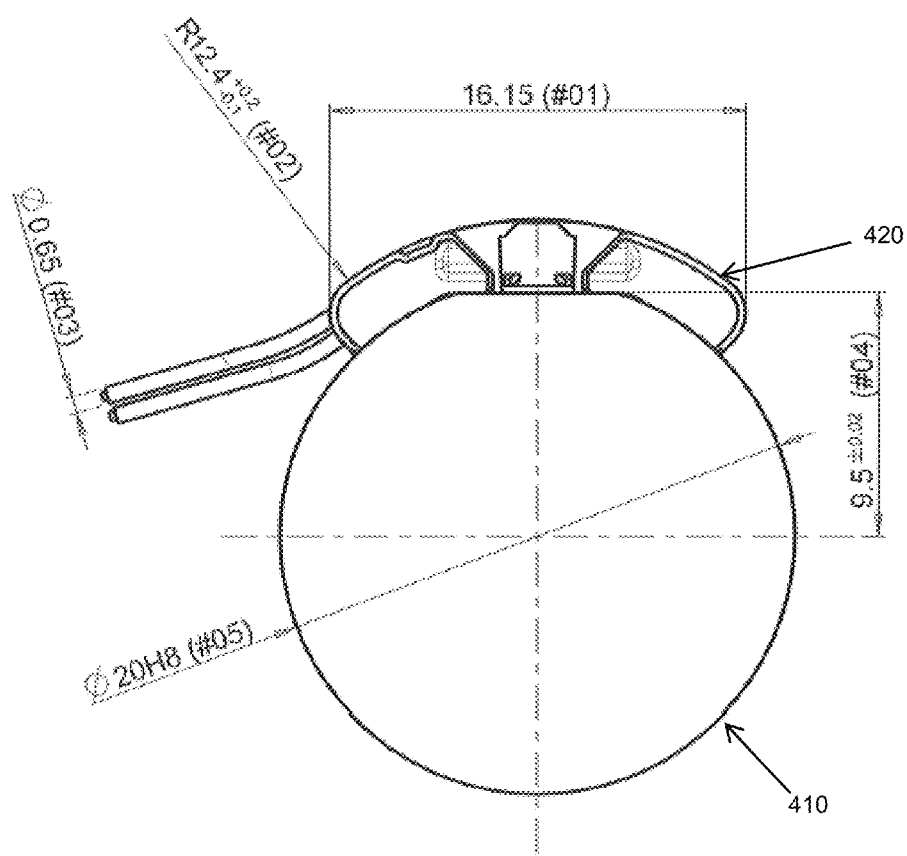
FIG. 5 is a representative depiction of a reticle system having a reticle and a light module, with the light module coupled at about the 12:00 position of the reticle according to one embodiment of the disclosure.

FIG. 5 is a schematic of a reticle system with a light module 420 coupled to the 12:00 position of the outer perimeter of the reticle 410. In certain embodiments, a light module for the reticle may be located in the main body but the battery, power source, and any associated electronics can be located in the base that couples to the main body of the viewing optic.

Figure 6A:
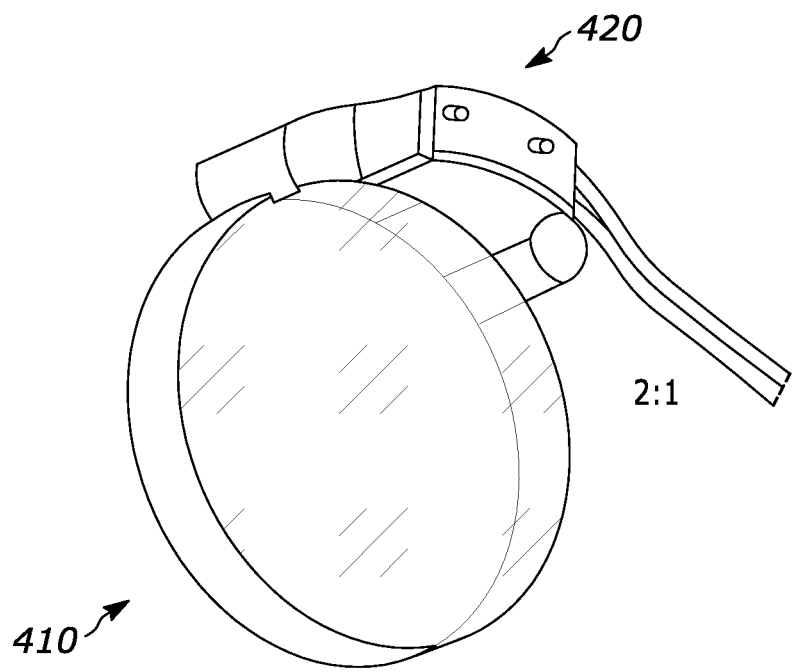
FIG. 6A is a representative depiction of a reticle system having a reticle and a light module according to one embodiment of the disclosure.
Figure 6B:
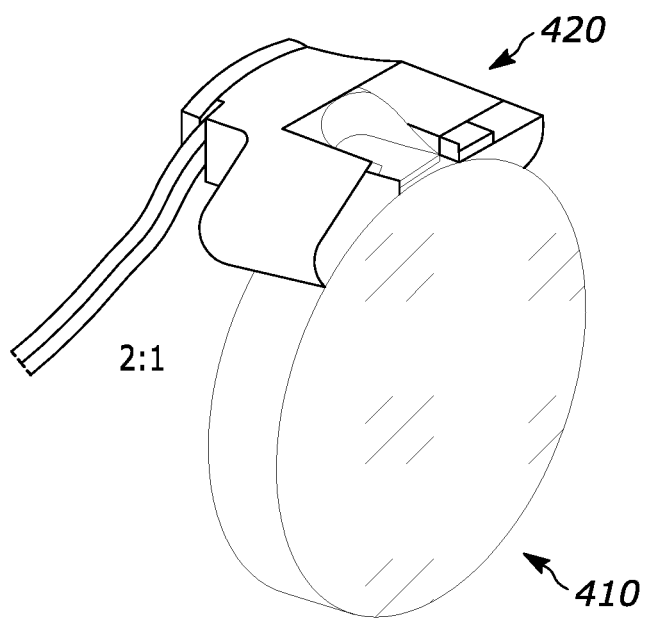
FIG. 6B is a representative depiction of a reticle system having a reticle and a light module according to one embodiment of the disclosure.

FIGS. 6A and 6B provide representative depictions of a reticle 410 with a light module 420. The module that directs light at the diffraction pattern on the reticle can be placed at about 1:00, or at 2:00 or at 3:00, or at 4:00, or at 5:00, or at 6:00 or at 7:00 or at 8:00 or at 9:00, or at 10:00 or at 11:00 or at 12:00 on the outer perimeter of the reticle.

In one embodiment, the light module is placed on the reticle from about the 3:00 position to about the 6:00 position on the reticle. In one embodiment, the light module is placed on the reticle from about the 3:00 position to about the 9:00 position on the reticle. In one embodiment, the light module is placed on the reticle from about the 3:00 position to about the 12:00 position on the reticle.

In one embodiment, the light module is placed on the reticle from about the 5:00 position to about the 7:00 position on the reticle. In one embodiment, the light module is placed on the reticle from about the 5:00 position to about the 9:00 position on the reticle.

In one embodiment, the light module is placed on the reticle from about the 4:00 position to about the 6:00 position on the reticle. In one embodiment, the light module is placed on the reticle from about the 4:00 position to about the 8:00 position on the reticle. In one embodiment, the light module is placed on the reticle from about the 4:00 position to about the 12:00 position on the reticle.

In another embodiment, the optics system is placed on the reticle from about the 6:00 position to about the 9:00 position on the reticle. In one embodiment, the light module is placed on the reticle from about the 6:00 position to about the 12:00 position on the reticle. In one embodiment, the light module is placed on the reticle from about the 6:00 position to about the 10:00 position on the reticle.

In one embodiment, the reticle is located at the first focal plane in the main body of the viewing optic and the optics system is located in base, which couples to the main body of the viewing optic.

In one embodiment, the base can have one or more light module systems including 2, 3, 4, 5 or more than 5 light module systems.

In on embodiment, the reticle is an IMT Power Light reticle including but not limited to IMT Power Light 22/25 or IMT Power Light 28. Not to be bound by any particular theory, in order to illuminate the structure, optical radiation is injected into the substrate from the side and this hits the illuminated structure via total reflection. IMT offers two technological solutions for this purpose: (1) diffractive structure; and (2) etch and fill.

For diffractive structure, optical grating is etched into the substrate. The injected radiation reaches the eye due to diffraction on the optical grating. Diffractive reticles are characterized by a high light yield and can therefore be used in even very bright environments.

For etch & fill, structure etched in substrate and the structure is filled with dye. Dye disperses the injected radiation to the eye. Etch & fill structures provide an alternative for applications in which brightness and resolution are less important.

2. Power Source

In one embodiment, the base that couples to the main body of the viewing optic has a power system. In another embodiment, the base of a viewing optic has a cavity. A battery cavity can be integrated into the base that couples to the main body of a viewing optic.

Figure 7:
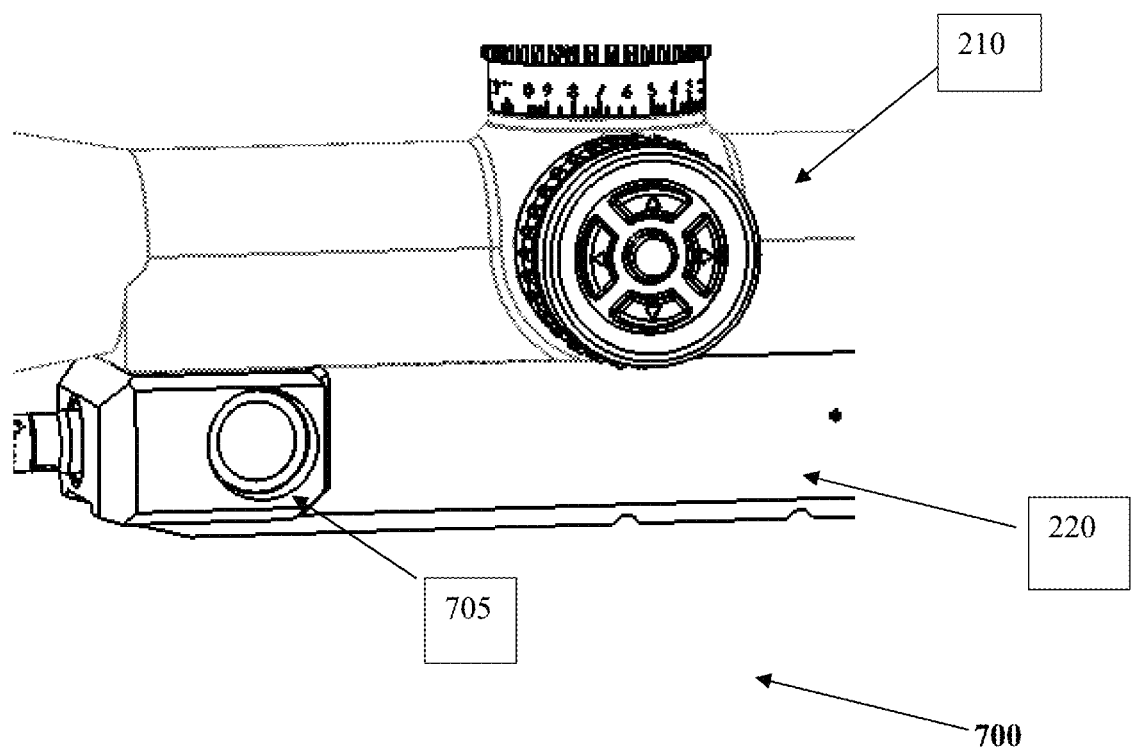
FIG. 7 is a view of riflescope having a main body and a base coupled to the main body, wherein the base has one or more compartments for a power source according to one embodiment of the disclosure.
Figure 8:
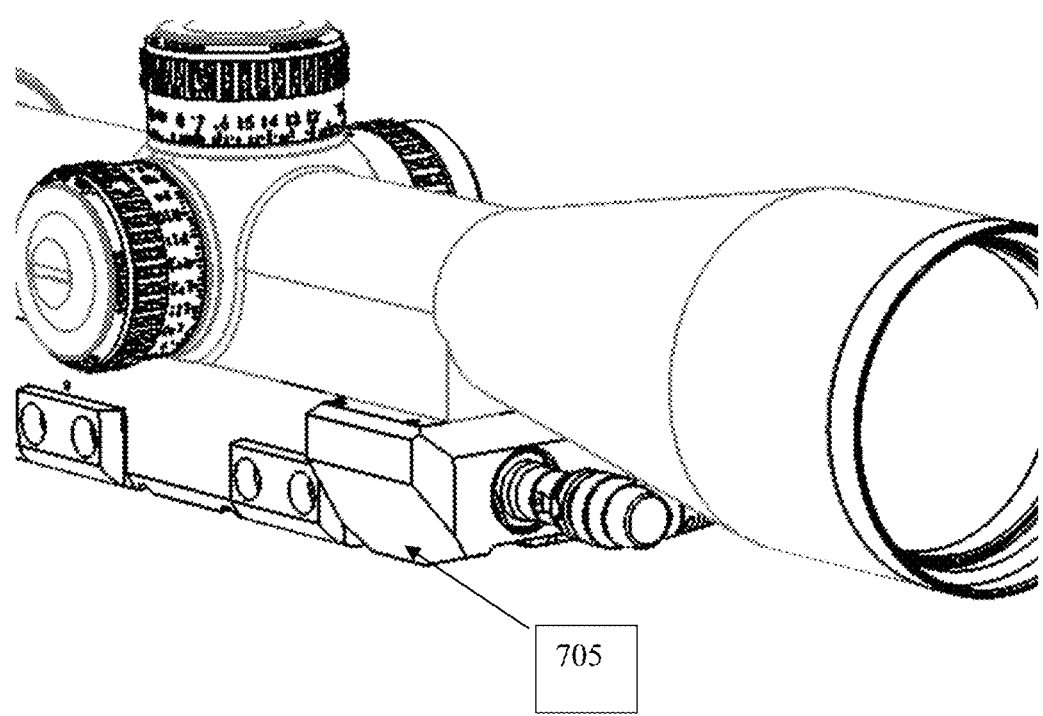
FIG. 8 is a view of riflescope having a main body and a base coupled to the main body, wherein the base has one or more compartments for a power source according to one embodiment of the disclosure.

FIG. 7 is a representative schematic of a base 220 with a battery compartment 705, wherein the base 220 is coupled to the main body 210 of a riflescope 700. As shown in FIGS. 7 and 8, the battery cavity 705 extends from each side of the base to encase a battery, including but not limited to a CR123 battery. The CR123 battery has increased power capacity and discharge as compared to smaller batteries or coin style batteries.

In one embodiment, the battery cavity 705 is integral to the base 220 so that only the battery cap is needed to protect the battery from the environment. No additional sealing is required.

In one embodiment, the battery cavity 705 in the base 220 is located closer to the objective assembly 710 of the main body 210 of a viewing optic as compared to the ocular assembly.

Figure 9:
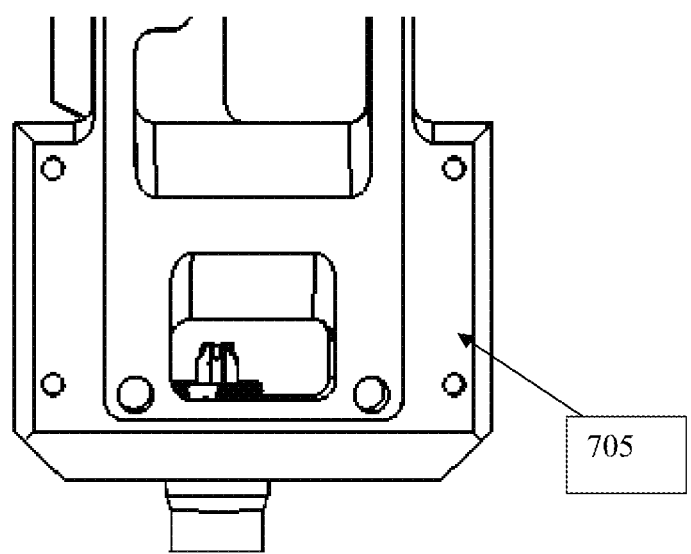
FIG. 9 is a bottom side view of a base that couples to a main body of a riflescope, wherein the base has one or more compartments for one or more power sources according to one embodiment of the disclosure.

FIG. 9 is a representative depiction of the battery compartment 705 integrated into the base 220. In one embodiment, the cavity 705 is designed to have the positive side of the battery inserted first with a mechanical stop at the bottom of the battery cavity to prevent improper installation and operation of the battery.

In one embodiment, the integrated battery cavity 705 can use the same gasket as the base 220 to the main body 210 of the riflescope. This provides a more reliable seal and eliminates a mechanical device as a separate battery cavity is not required. Secondly, there is no mechanical device securing the battery cavity since it is integrated into the base. This reduces the need for any mechanical interface for securing the battery compartment. Because there is no need for mechanical locking of the battery cavity, the integrated battery compartment reduces the points of failure for a traditional battery compartment.

The integrated battery compartment eliminates any obstacles that are in the way of the user. The integrated battery compartment is located under the viewing optic out of the way of any of the adjustments and knobs found on traditional viewing optics. The integrated battery cavity is a significant advancement as it allows the necessary space to accommodate a larger battery.

3. Picatinny Mount

In one embodiment, the disclosure relates to a viewing optic having a main body and a base with a battery compartment and a picatinny mount that can couple to the battery compartment. In one embodiment, a removable picatinny mount is attached to a protruded battery compartment that is incorporated into a base coupled to a main body of a riflescope.

Figure 10:
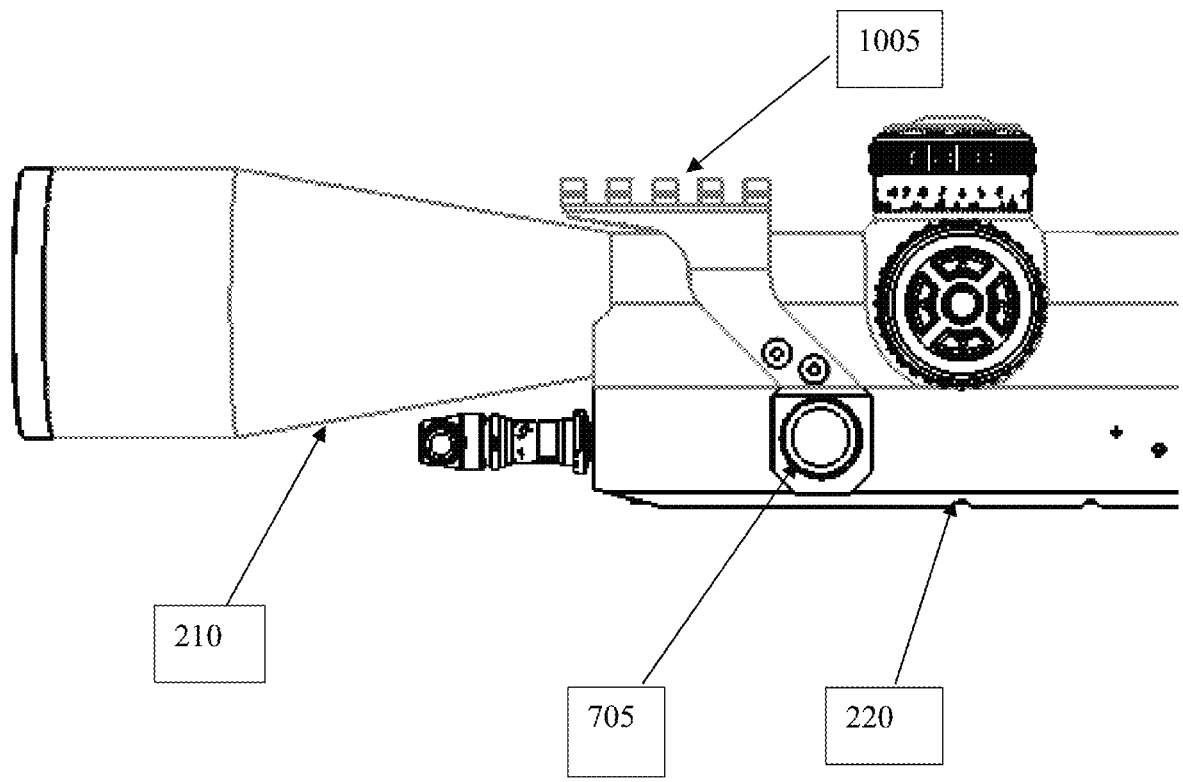
FIG. 10 is a view of a riflescope having a main body and a base having a compartment for a power source, wherein a picatinny mount can couple to the power source compartment according to one embodiment of the disclosure.
Figure 11:
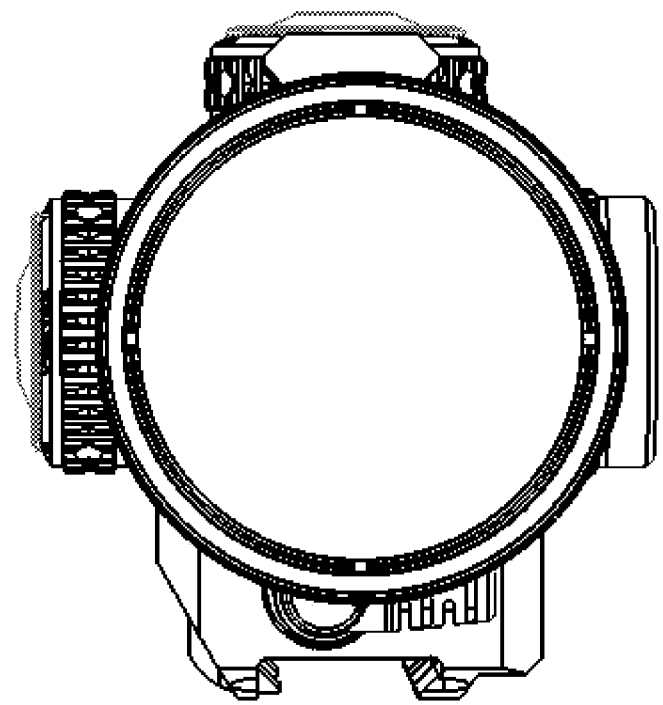
FIG. 11 is a front side view of a riflescope with a picatinny mount according to one embodiment of the disclosure.
Figure 12:
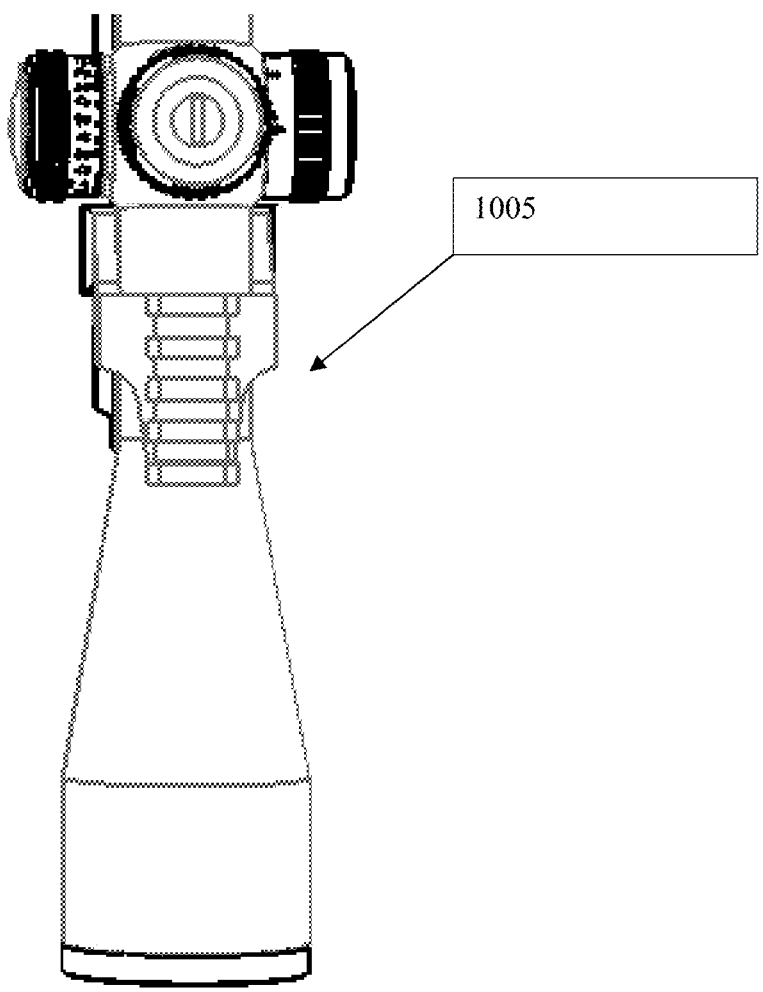
FIG. 12 is a top side view of a riflescope with a picatinny mount according to one embodiment of the disclosure.

FIGS. 10-12 are representative schematics of a riflescope with a main body 210 and a base 220 coupled to the main body 210, with the base having a battery compartment 705 that can attach to a picatinny mount 1005. In one embodiment, the picatinny mount 1005 is aligned with the battery compartment 705 and secured with fasteners.

By attaching the mount 1005 to the battery compartment 705 of the base 220, it utilizes the material needed to make the cavity 705 for the battery. This eliminates the need for any additional material from the base, thereby making the viewing optic lighter and less invasive.

In one embodiment, the mount is located towards the objective of the turrets and parallax knob so as to not intrude on the user's ability to adjust the riflescope. Further, the top ring is removable allowing for easy attachment of an accessory device, such as a laser rangefinder. By utilizing the picatinny mount disclosed herein, no additional structural support from the top portion of the ring is needed since the integrated base secures the riflescope.

In one embodiment, the mount incorporates a cantilevered picatinny rail that extends forward towards the objective of the riflescope. This allows a weapons mounted laser range finder to sit directly over the bell of the riflescope. This style of mount allows for decreased shift of impact and increased accuracy of the ranging device. It decreases the potential for shift of impact since there are fewer variables that may affect the ranging device from acquiring the desired target.

4. Data Ports

In one embodiment, the disclosure relates to a viewing optic with a main body and a base with an optics system for directing light at a diffraction pattern on a reticle, wherein the base has axially orientated data ports for interfacing with ancillary devices including but not limited to remote control switches and laser range-finders.

Figure 13:
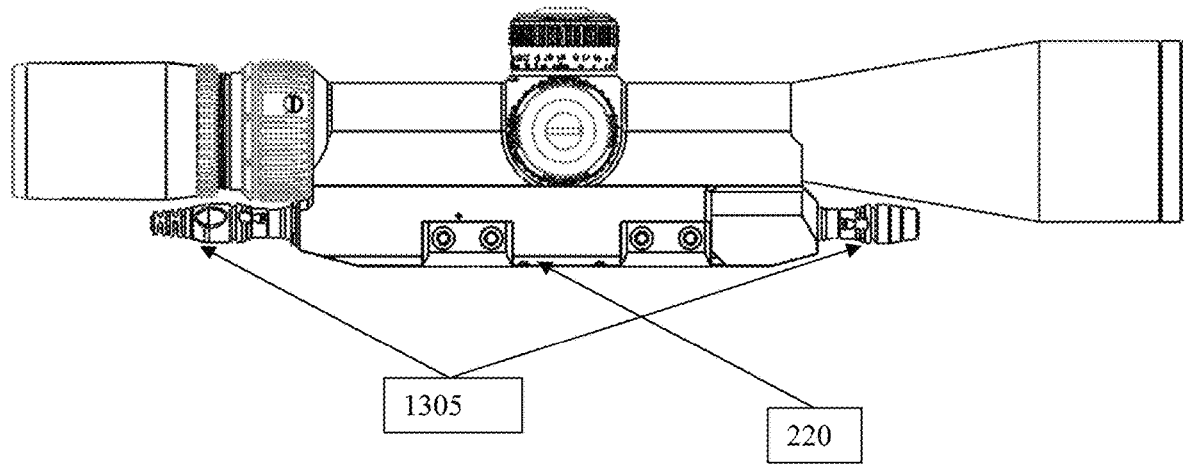
FIG. 13 is a side view of a riflescope having a main body and a base, wherein the base has one or more axially oriented connectors according to one embodiment of the disclosure.

FIG. 13 is a representative schematic of a riflescope 1300 with a main body 210 and a base 220 with axially oriented data ports 1305. In one embodiment, the viewing optic can have one axially oriented data port. In another embodiment, the viewing optic can have two or more axially oriented data ports.

By utilizing an axially oriented data port 1305, the top down profile of the overall viewing optic is minimized, thereby increasing the robustness of the mounted system and its connections.

Figure 14:
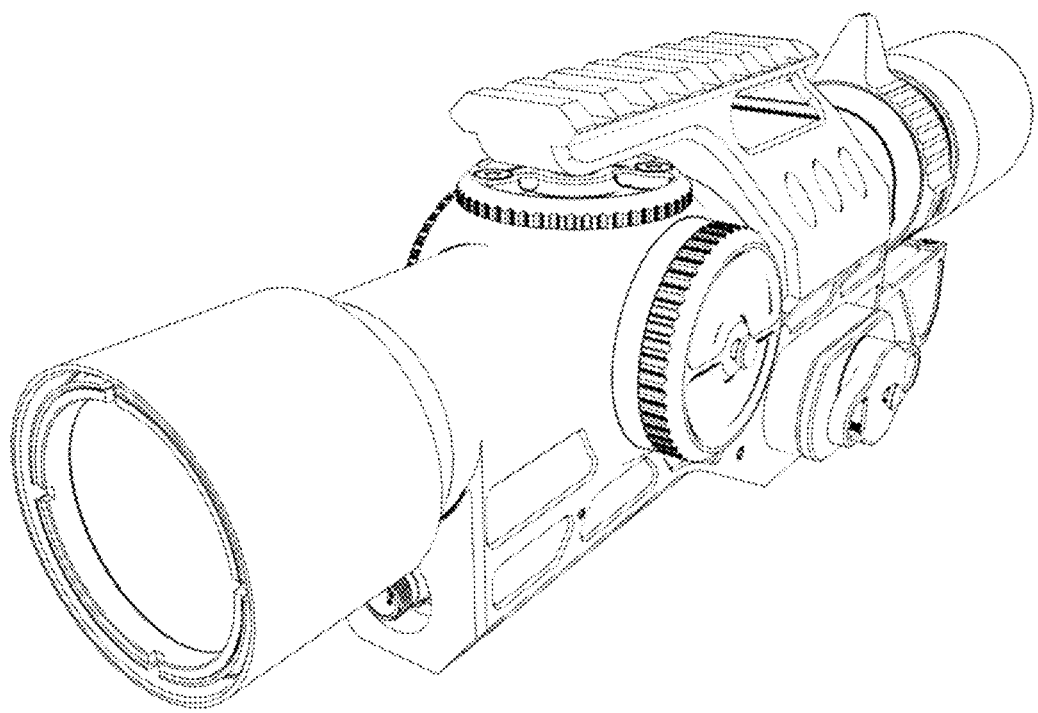
FIG. 14 is a side view of a riflescope having a main body and a base, and a picatinny mount coupled to a top portion of the main body according to one embodiment of the disclosure.

FIG. 14 is a representative example of a riflescope with a main body, and a base coupled to the main body and having an optic system for directing light at a diffraction pattern on the reticle. The base can have one or more compartments for power sources. The riflescope can have a picatinny mount.

IV. Additional Embodiments

In one embodiment, the disclosure relates to a viewing optic having a main body with an optical system having an objective lens system, an erector system, and an eyepiece lens system and a moveable optical element having a first focal plane reticle and a second focal plane reticle, and a turret assembly that can adjust the moveable optic element, and a light module for the first focal plane reticle and/or the second focal plane reticle that is located in a portion of the turret assembly. In one embodiment, at least a portion of the light module is located in a portion of the turret assembly, In one embodiment, the light module or at least a portion of the light module is located in a cap or cover of the turret assembly. In one embodiment, at least a portion of the light module is located in one or more adjustment knobs of the optical system.

In one embodiment, the disclosure relates to a viewing optic with a main body and one or more adjustment knobs including but not limited to an elevation knob, and an illumination knob. In one embodiment, the optics system for directing light to a diffraction pattern on a reticle is enclosed with the inner space of an adjustment knob.

Figure 15:
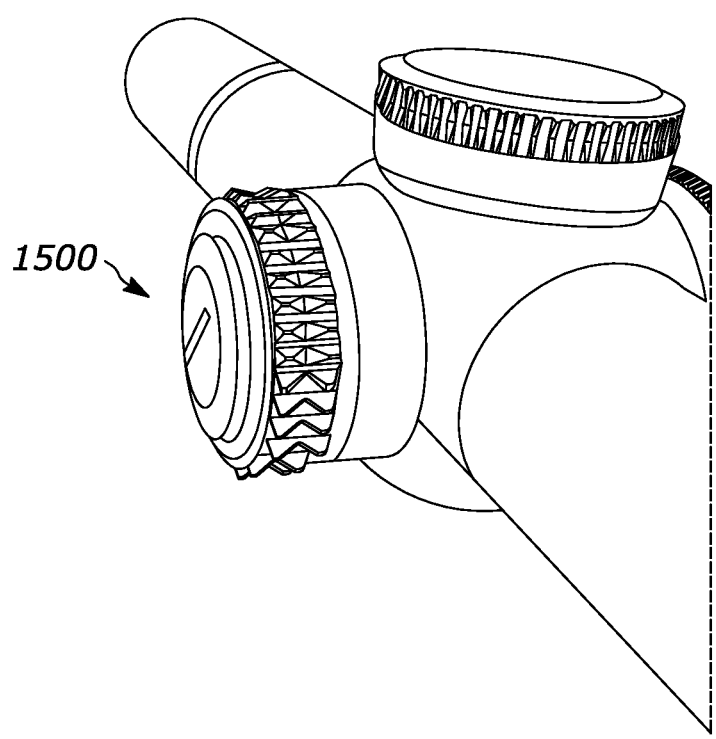
FIG. 15 is a side view of a riflescope with an optics system for directing light to a reticle housed within an adjustment knob of the scope according to one embodiment of the disclosure.

In one embodiment, FIG. 15 depicts a riflescope having one or more adjustment knobs, wherein the interior portion of the adjustment knob can house an optics system or light module for directing light to a reticle. The reticle can be located in the FFP and/or the SFP.

The optics system or light module can be housed in any suitable adjustment knob including but not limited to a windage knob, an elevation knob, an illumination knob, and parallax adjustment knob. More than one optics systems or light modules can be housed in one or more adjustment knobs.

In another embodiment, a threaded "cup" on the bottom of the turret saddle area could be used to create a "pocket" for the light module or optics system.

The apparatuses and methods disclosed herein can be further described in the following paragraphs:

1. A viewing optic comprising: (a) a main tube; (b) an objective system coupled to a first end of the main tube that focuses a target image from an outward scene; (c) an ocular system coupled to the second end of the main tube, the main tube, objective system and ocular system being configured to define at least a first focal plane, with a first reticle at the first focal plane; and (d) a base coupled to the main body and having a light module to direct light at the first focal plane reticle.

2. A viewing optic comprising: (i) a main body with an optical system for generating images along a viewing optical axis of an outward scene and (ii) a base coupled to the main body and having an optics system to direct light at a diffraction pattern on a reticle.

3. A viewing optic comprising:
a main body having (i) a first optical system having an objective lens system that focuses a target image from an outward scene to a first focal plane, an erector lens system that inverts the target image, a second focal plane; and
a base that couples to the main body having a second optical system to direct light at a diffraction pattern on a reticle.

4. A viewing optic comprising a main body with an optical system for viewing an outward scene and a base that couples to a bottom portion of the main body, the base having a cavity with an optics system to direct light at a diffraction pattern on a reticle.

5. The viewing optic of any of the preceding statements, wherein one end of the base attaches near a magnification adjustment ring of the main body and the other end of the base attaches near the objective assembly of the main body.

6. The viewing optic of any of the preceding statements, wherein the base is from 40% to 65% the length of the main body.

7. The viewing optic of any of the preceding statements, wherein the base further comprises a compartment for a power source.

8. The viewing optic of any of the preceding statements, wherein the optic system attaches to a reticle in a first focal plane.

9. The viewing optic of any of the preceding statements, wherein the optic system attaches to a reticle in a first focal plane from about the 3:00 position to about the 6:00 position of the reticle.

10. The viewing optic of any of the preceding statements, wherein the optics system attaches to a reticle at about the 6:00 position of the reticle.

11. A viewing optic comprising a main body having an optical system comprised of an objective lens system that focuses an image from a target down to a first focal plane (hereafter referred to as the "FFP Target Image"), followed by an erector lens system that inverts the FFP Target Image and focuses it to a second focal plane (hereafter referred to as the "SFP Target Image"), an eyepiece lens system that collimates the SFP Target Image so that it can be observed by the human eye, and a base coupled to the main body and having a light module for a reticle.

12. A viewing optic comprising: (a) a main tube; (b) an objective system coupled to a first end of the main tube that focuses a target image from an outward scene; (c) an ocular system coupled to the second end of the main tube, the main tube, objective system and ocular system being configured to define at least a first focal plane, with a first reticle at the first focal plane; and (d) a base coupled to the main body and having at least a portion of a light module to direct light at the first focal plane reticle.

13. A viewing optic comprising: a main body having an optical system comprised of an objective lens system that focuses an image from a target to a first focal plane (hereafter referred to as the "FFP Target Image"), with a reticle located at the FFP; an erector lens system that inverts the FFP Target Image and focuses it to a second focal plane (hereafter referred to as the "SFP Target Image"), an eyepiece lens system that collimates the SFP Target Image so that it can be observed by the human eye, and a knob for adjustment of the optical system, wherein the knob has a light module for the first focal plane reticle.

14. A viewing optic comprising: a main body having an optical system comprised of an objective lens system that focuses an image from a target to a first focal plane (hereafter referred to as the "FFP Target Image"), with a reticle located at the FFP; an erector lens system that inverts the FFP Target Image and focuses it to a second focal plane (hereafter referred to as the "SFP Target Image"), with a reticle located at the SFP, an eyepiece lens system that collimates the SFP Target Image so that it can be observed by the human eye, and a knob for adjustment of the optical system, wherein the knob has a light module to illuminate the first and second focal plane reticles.

15. A viewing optic comprising: a main body having an optical system comprised of an objective lens system that focuses an image from a target to a first focal plane (hereafter referred to as the "FFP Target Image"), with a reticle located at the FFP; an erector lens system that inverts the FFP Target Image and focuses it to a second focal plane (hereafter referred to as the "SFP Target Image"), with a reticle located at the SFP, an eyepiece lens system that collimates the SFP Target Image so that it can be observed by the human eye, and a first knob for adjustment of the optical system, wherein the first knob has a light module to illuminate the first focal plane reticle and a second knob for adjustment of the optical system, wherein the second knob has a light module to illuminate the second focal plane reticle.

16. A viewing optic as substantially shown and described herein.

17. Methods of using a viewing optic as substantially shown and described herein.

While multiple embodiments of a viewing optic with a base have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

All patents and patent applications recited herein are incorporated by reference in their entirety.

What is claimed is:

1. A viewing optic comprising: (a) a main tube; (b) an objective system coupled to a first end of the main tube that focuses a target image from an outward scene; (c) an ocular system coupled to the second end of the main tube, the main tube, the objective system and the ocular system being configured to define a first focal plane having a first reticle and a second focal plane having a second reticle; and (d) a base coupled to the main tube, wherein the base has a first light module to direct light at the first focal plane reticle and a second light module to direct light at the second focal plane reticle, wherein the base has a length from 40% to 65% the length of the main tube.

2. The viewing optic of claim 1, wherein one end of the base attaches near a magnification adjustment ring of the main tube and the other end of the base attaches near the objective system of the main tube.

3. The viewing optic of claim 1, wherein the base further comprises a power source.

4. The viewing optic of claim 1, wherein a portion of the first light module attaches to an outer perimeter of the first focal plane reticle.

5. The viewing optic of claim 1, wherein a portion of the first light module attaches to an outer perimeter of the first focal plane reticle from about a 3:00 position to about a 6:00 position of the first reticle.

6. The viewing optic of claim 1, wherein a portion of the first light module attaches to an outer perimeter of the first focal plane reticle at about a 6:00 position of the first reticle.

7. A viewing optic comprising: a main body with an optical system for viewing an outward scene having a first focal plane reticle and a second focal plane reticle and a base that couples to a bottom portion of the main body, the base having a first light module to direct light at a diffraction pattern on the first focal plane reticle, wherein a portion of the first light module attaches to an outer perimeter of the first focal plane reticle from about a 3:00 position to about a 6:00 position of the first focal plane reticle and a second light module to direct light at a diffraction pattern on the second focal plane reticle, wherein the base has a length from 40% to 65% the length of the main body.

* * * * *